Patented Apr. 10, 1945

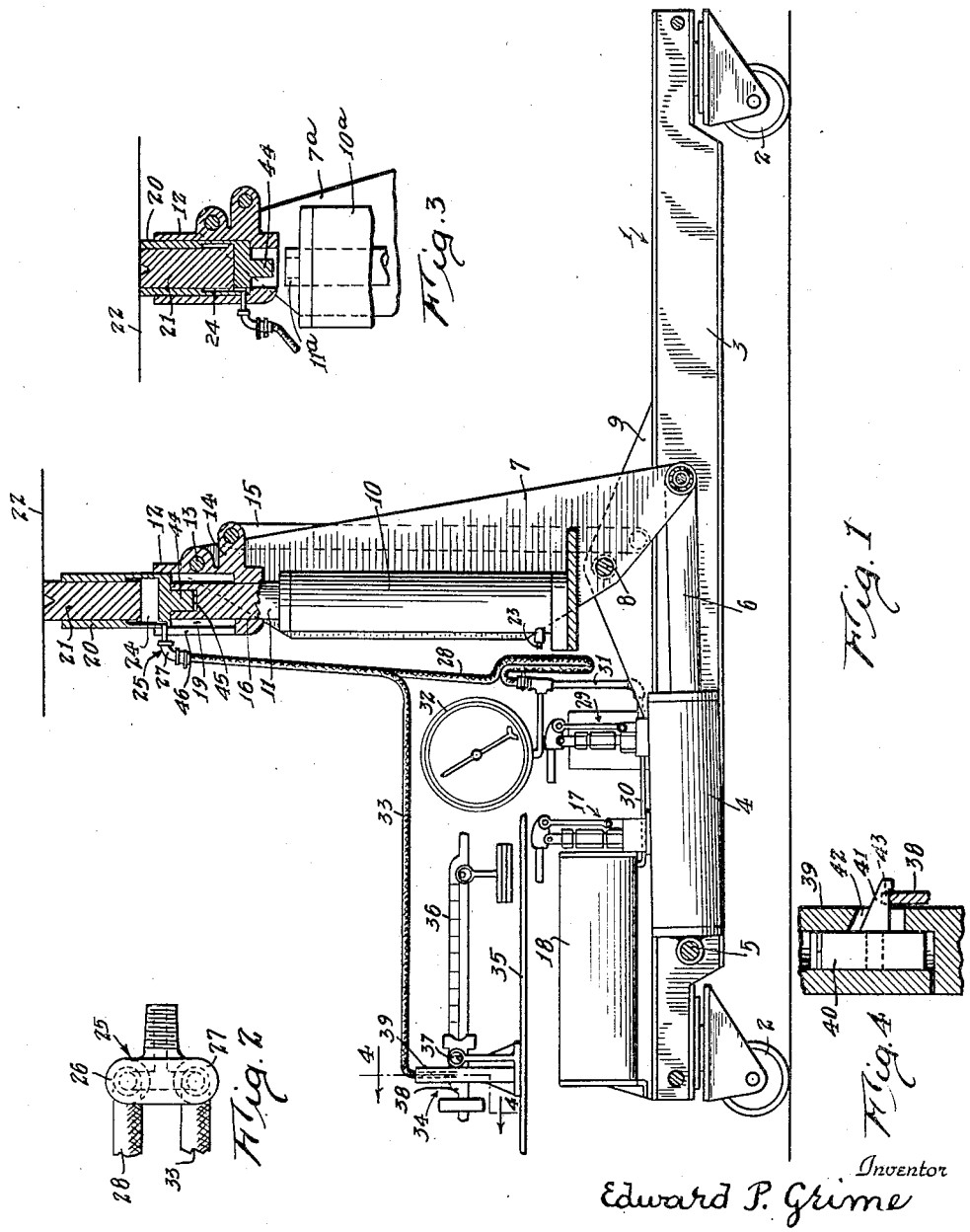

2,373,469

UNITED STATES PATENT OFFICE 2,373,469

WEIGHT INDICATING LIFTING JACK

Edward P. Grime, Los Angeles, Calif.

Application September 11, 1943, Serial No. 502,002

5 Claims. (Cl. 265—47)

In using lifting jacks, it is frequently desirable to know what weight the jack is supporting and for this purpose, heretofore it has been suggested to support a jack on a scale which enables the weight of the jack and the load supported thereby to be weighed.

An object of the present invention is to provide a lifting jack with simple means through the operation of which a relatively heavy load supported on the jack can have its weight indicated without employing a scale capable of directly weighing the load on the jack.

In the preferred embodiment of the invention, it includes a pressure chamber employed as an accessory to the jack arranged so that the fluid pressure in this pressure chamber can support the load that is supported by the jack, and one of the objects of the invention is to provide a jack construction of this kind which will enable the load supported by this auxiliary pressure chamber to be indicated without necessitating the use of heavy scales sufficiently heavy to actually weigh directly the load on the jack.

It has been suggested heretofore to weigh the load on the hydraulic jack by providing a connection from the hydraulic cylinder or other hydraulic lifting device which leads the operating fluid which is under pressure, to a scale which actually weighs the entire load supported by the jack. The objection to that plan is that when a number of jacks of different power are employed, there must be provided a fluid operated weighing accessory corresponding to each jack.

One of the objects of my invention is to construct a lifting jack with parts that will cooperate to enable a small fraction of the load that the jack supports to be weighed on a pressure control indicating apparatus that will operate to indicate the load on the jack without actually weighing it; also to provide a construction including certain parts that cooperate particularly with the fractional weighing apparatus which will enable the same to be interchangeable with jacks of different power.

Another object of the invention is to provide a construction that can be incorporated in a jack that has a wide range to lift and which will enable such a jack to indicate the load upon it without actually weighing the load.

Further objects of the invention will appear hereinafter.

The invention consists in the novel parts and combinations of parts to be described hereinafter, all of which contribute to produce an efficient weight indicating lifting jack.

A preferred embodiment of the invention is described in the following specification, while the broad scope of the invention is pointed out in the appended claims.

In the drawing:

Fig. 1 is a longitudinal section through the lifting jack of my invention embodying means for enabling the weight on the jack to be readily indicated, certain parts being broken away and others shown in section or elevation.

Fig. 2 is a plan of a double elbow connection that I may employ and which is associated with the fluid pressure chamber that cooperates in enabling the weight or load on the jack to be indicated.

Fig. 3 is a vertical section corresponding to the upper portion of Fig. 1 but showing the cylinder of the jack in a released position which it has when its plunger has withdrawn and has removed itself from engagement with the accessory parts that function in connection with the means for indicating the load on the jack.

Fig. 4 is a vertical section on an enlarged scale taken about on the line 4—4 of Fig. 1 and particularly illustrating the details of means employed for indicating the weight on the jack, certain parts being broken away.

The lifting jack illustrated includes a portable frame 1 mounted on wheels 2 and comprises two side bars such as the side bar 3 of channel form or a similar structural shape. Towards one end of this frame a fluid operated cylinder 4 is provided, one end of which is mounted for rotation on a horizontal axis formed by a transverse bar 5 connecting the two side bars 3.

The piston or plunger 6 that extends from this cylinder is attached to an arm 7 consisting of two separated plates mounted for rotation on a horizontal transverse bar 8 that is supported in gusset plates such as the plate 9 mounted on the side bars 3. Between the plates which form the arm 7 a fluid-operated cylinder 10 is mounted, and this cylinder carries a piston or plunger 11.

This jack has a relatively large range of movement and is intended to lift the load from a short distance above the ground level to a height of 60 inches or more. When the jack is to take the load at a low level, the plunger 6 is withdrawn into the cylinder 4 and the arm 7 occupies a substantially horizontal position between the side bars 3. At this time the plunger 11 would be withdrawn into the cylinder 10 so that its outer end would be out of contact with a guide head or block 12, which block is pivotally mounted between the side plates of the arm 7 on a transverse pin 13. This block 12 has a short arm 14 projecting outwardly from it and the end of this arm at each side is connected by means of a link 15 to one of the gusset plates 9. This link operates to give a parallel movement to the block or guide 12 so as to keep its axis in a vertical position regardless of whether the arm 7 is in its upright position as shown in Figure 1 or in its folded horizontal position between the bars 3 of the frame 1.

The lower portion of the block 12 is formed with a guide opening 16 to receive the upper or outer end of the plunger 11 and there should be some clearance between the plunger and this opening so as to insure that the plunger can always pass freely into the block or withdraw freely from it to a position such as that indicated in Figure 3.

In order to enable the arm 7 to be moved between its two extreme positions, a small hand pump 17 is provided that is capable of pumping fluid from a reservoir 18 into either end of the cylinder 4.

The block 12 is preferably formed with a bore 19 that operates as a guide for a cap cylinder 20.

In the operation of the jack when the arm 7 is swung to its upright position, the plunger 11 will occupy a depressed position such as indicated by the plunger 11ª in Figure 3, and at this time the cap cylinder 20 will rest at the bottom of the guide bore 19. The cap cylinder 20 has a plunger or piston 21 within it which at this time would be substantially flush with the upper end of the cylinder 20 so that it will engage the load or part that it is intended to lift, the bottom face of which is indicated by the line 22. After the load has been raised on the arm to this position, the cylinder 10 is then operated by admitting operating fluid through a connection 23 to force the plunger 11 upwardly and as the plunger rises, it moves through the opening 16 and raises the cap cylinder 20 and its plunger 21 which, however, is still in a depressed position such as that indicated in Figure 3. The fluid under pressure to raise the plunger 11 in this way is supplied through the agency of a pump, which is not illustrated, but which would be similar in construction to the pump 17.

In order to indicate the weight or load being supported by the jack plunger 11, I provide means for supplying fluid under pressure to the pressure chamber 24 that is formed in the bottom of the cap cylinder 20 and below the plunger 21, and this means preferably includes a twin elbow connection 25 presenting two elbow forks 26 and 27, one of which is attached to a flexible connection or hose 28 through which operating fluid is supplied from a jack pump 29 connected to the reservoir 18 through a pipe connection 30. The lower end of the hose 28 is attached to a pipe connection 31 that may be provided with a lateral connection to a gauge 32 for indicating the pressure in the hose 28.

The elbow 27 is connected through a flexible connection or hose 33 to a weight indicating device 34 which is supported on a suitable fixed base 35 and which in the present instance includes a scale beam 36 pivotally supported at 37 with the actuating arm 38 of the scale beam extending past an upright miniature cylinder 39. This miniature cylinder is provided with a plunger 40 within it above which the operating fluid is supplied through the hose 33. This will force the plunger down and operate to depress the actuating arm 38 of the scale beam. This is accomplished through the agency of a flat finger 41 attached to the plunger and which projects out through a slot 42 in the wall of the cylinder 39. This detail is illustrated in Figure 4. The lower edge of the finger 41 is received in a notch 43 formed in the upper edge of the scale beam.

The plunger 21 and its cylinder 20 have the same diameter regardless of whether this cap cylinder is used with the jack illustrated in Figure 1 or on jacks having plunger cylinders 10 of larger or smaller diameters; in other words, this cap cylinder 20 is interchangeable with a number of jacks which may be of different power and have cylinders of larger or smaller diameter than the cylinder 10, and even operating, each with its own distinctive working pressure different from that of the other jacks. In order to enable this to be accomplished, I prefer to construct the base of the cylinder 20 so that it will seat securely on the plunger 11 or 11ª when it comes up through the guide opening 16. For this purpose the bottom head of the cap cylinder 20 is formed with a downwardly projecting stem 44 that fits into a socket 45 formed in the upper end of the plunger and which operates as a seat for it.

The side wall of the cap cylinder 12 has a slot 46 that provides clearance for the twin elbow fitting 25 as the cylinder 20 moves up or down in the block 12.

As the bore of the cylinder 39 is diminutive it exerts a relatively small force against the actuating arm 38 of the scale beam 36. However, this force will be proportional to the weight that is actually being supported by the plunger 21 through the agency of a fluid in its chamber 24. In this way I am enabled to weigh a weight of many tons supported on the plunger 21, by a scale which would be weighing only a portion of this load. In this way tons at the plunger 21 can be represented by 100 lb. weights or even less, applied on the long arm of the scale beam 36.

Referring again to Figure 3, it should be noted that in this figure the jack cylinder 10ª is of much larger diameter than the jack cylinder 10; in other words, it is a cylinder for a more powerful jack than that illustrated in Figure 1, but the arm 7ª for the more powerful jack shown in Figure 3 would be surmounted by a block 12 having the same dimensions as the block 12 and contiguous parts shown in Figure 1.

Many other embodiments of the invention may be resorted to without departing from the spirit of the invention.

I claim:

1. In a lifting jack, the combination of a plunger capable of being moved upwardly to raise a load, a cap cylinder seated on the end of said plunger, including a cylindrical casing with a cap plunger therein extending upwardly and adapted to engage under the load, said cap cylinder having a chamber below the cap plunger, means including a flexible connection for supplying operating fluid under pressure to said chamber to raise the load and support the same on the cap plunger for weighing the load, and a weight indicator for indicating the load being supported by the jack, and connected to the fluid pressure existing under the cap plunger so as to be actuated through the agency of the said fluid pressure in the cap cylinder.

2. In a lifting jack, the combination of a plunger capable of being moved upwardly to raise a load, a block, means supporting said block above said plunger, a cap cylinder seated on said block, said block having an opening through which the upper end of said plunger may move upward to engage and lift the cap cylinder, said cap cylinder including a cylindrical casing with a cap plunger to engage under the load, a fluid pressure system with means for admitting operating fluid under the cap plunger to lift the load for obtaining its weight, and a weight indicator for indicating the load being supported, and connected to the fluid pressure system, said weight indicator including a plunger subjected to the said fluid pressure for actuating the weight indicator.

3. In a lifting jack, a plunger, a cap cylinder supported on the plunger, including a cylindrical casing, and a cap plunger to extend above the cap cylinder casing, a fluid pressure system with a flexible connection maintaining connection to the cap cylinder in any position said cap cylinder may assume, a weight indicator, a cylinder, connected up to the fluid pressure system so that it is subjected to the same pressure as that in the cap cylinder, and having a plunger thrusting against the weight indicator, and means for applying additional fluid pressure to the cap cylinder to cause said cap plunger to lift a load resting thereon.

4. In a lifting jack, the combination of a jack plunger, a cap cylinder carried on the end of the plunger, and having a cap plunger for engaging under the load, a fluid pressure system including means for admitting the fluid under pressure from the pressure system to the cap cylinder to enable the cap plunger to lift the load slightly for obtaining the weight of the load, a weight indicator having a scale beam, and a diminutive cylinder having a chamber to which the fluid pressure of the cap cylinder is admitted, and having a plunger for thrusting against the said scale beam.

5. In weight indicating jack apparatus, the combination of a lifting member, a cap cylinder carried on the end of the lifting member, said lifting member providing a seat for supporting the cap cylinder directly under the point of application of the lifting force to the load, said cap cylinder having a fluid operated plunger of a predetermined diameter, means for supplying fluid under pressure to said cap cylinder to cause said cap plunger to lift said load; a weighing scale, and a fluid operated weighing device associated with the scale including a weighing cylinder, and a plunger in the weighing cylinder having a diameter with a predetermined ratio to the diameter of the plunger of the cap cylinder, and a connection from the cap cylinder to the weighing cylinder, said weighing cylinder mounted so as to enable its plunger to exert its force against the scale.

EDWARD P. GRIME.